(12) United States Patent
Ohta et al.

(10) Patent No.: US 7,296,664 B2
(45) Date of Patent: Nov. 20, 2007

(54) ROTARY DAMPER

(75) Inventors: Naotoshi Ohta, Tokyo (JP); Ryusuke Takahashi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 313 days.

(21) Appl. No.: 10/396,819

(22) Filed: Mar. 26, 2003

(65) Prior Publication Data

US 2003/0183039 A1 Oct. 2, 2003

(30) Foreign Application Priority Data

Mar. 27, 2002 (JP) ............................. 2002-087537

(51) Int. Cl.
*F16D 57/02* (2006.01)
(52) U.S. Cl. .................... 188/294; 188/130; 188/83
(58) Field of Classification Search ............. 188/290, 188/293, 294, 296, 130, 322.5, 83; 16/54, 16/82, 85, 197; 4/246.2, 236, 240
See application file for complete search history.

(56) References Cited

U.S. PATENT DOCUMENTS 4,694,530 A 9/1987 Foggini
4,893,522 A 1/1990 Arakawa
5,001,809 A 3/1991 Kim et al.

FOREIGN PATENT DOCUMENTS

| DE | 44 13 325 A1 | 10/1995 |
| EP | 0 422 882 A1 | 4/1991 |
| GB | 2 288 450 A | 10/1995 |
| JP | 2544628 B2 | 7/1996 |

OTHER PUBLICATIONS

Patent Abstracts of Japan, vol. 013, No. 189, May 8, 1989, JP 01-015547, Jan. 19, 1989.

*Primary Examiner*—Xuan Lan Nguyen
(74) *Attorney, Agent, or Firm*—Foley & Lardner LLP

(57) ABSTRACT

A rotary damper includes: a damper body mounted on a rotary shaft; a cam mechanism provided in the damper body to set a rotation pattern of the rotary shaft; a restoring force-accumulating member that accumulates a restoring force in accordance with rotation of the rotary shaft; and a rotation control member for controlling the rotation of the rotary shaft. The damper body is formed by setting a bottomed, cylindrical outer case having an opening at one end thereof and a bottomed, cylindrical inner case having an opening at one end thereof, face-to-face with each other and fitting the two with each other rotatably. The rotation control member is interposed between an inner periphery surface of the outer case and an outer periphery surface of the inner case on an outer periphery side of the damper body.

19 Claims, 5 Drawing Sheets

ROTARY DAMPER

BACKGROUND

The present invention relates to a rotary damper used in a vehicle such as an automobile.

In a vehicle such as an automobile there are provided various receptacle portions within a passenger compartment. Some such receptacle portions are provided with a lid that closes when it is pushed once and opens when it is pushed once more. One such lid, which is supported through a rotary damper, is disclosed in Japanese Patent No. 2544628.

As shown in FIGS. 7 and 8, this rotary damper includes: (a) a cylindrical rotor 1 that receives a rotational input, (b) a housing 2 that has a shaft 3 that is fitted in an inner periphery of the cylindrical rotor 1 and also has a cylindrical wall 4 that surrounds the shaft 3. A viscous fluid 5 is interposed between the inner periphery of the cylindrical rotor 1 and the shaft 3 of the housing 2. A coiled spring 6 is interposed between an inner periphery of the cylindrical wall 4 of the housing 2 and an outer periphery of the cylindrical rotor 1. The coiled spring 6, which is fixed at one end thereof to the housing 2 and at an opposite end thereof to the cylindrical rotor 1, is tightened with rotation of the cylindrical rotor 1, which rotation is performed upon receipt of a rotational input in the cylindrical rotor. A cover 7 is fixed to the housing 2 so as to close an open end face of the cylindrical wall 4 of the housing; an inner surface of the cover 7 is opposed to an end face of the cylindrical rotor 1. A spiral groove 9, which is formed in one of the inner surface of the cover 7 and the end face of the cylindrical rotor 1, is provided at one end thereof with a heart cam groove 10. An operating pin 8 is mounted to the other of the cover 7 and the cylindrical rotor 1 and is guided through the spiral groove 9.

An input/output shaft 12, which projects outward from the cover 7, is integral with the cylindrical rotor 1; a lid of a receptacle portion is attached to the input/output shaft 12.

The heart cam groove 10 is provided with: (a) heart island 10', (b) end portions 10a and 10c of two arcuate and straight paths, respectively, that are formed along both side portions of the heart island 10', and (c) a slit 10b that is formed in a rear end portion of the heart island 10' at an intermediate position of a path that interconnects the arcuate and straight paths at positions near the two end portions 10a and 10c.

When the lid is pushed into a closed state from an open state, the input/output shaft 12 connected to the lid is rotated. Thus, when the lid is pushed, a rotational force is imparted to the cylindrical rotor 1 through the input/output shaft 12. As a result of the rotational force, the coiled spring 6 is tightened and a restoring force is accumulated in the spring. At this time, the operating pin 8 moves along the spiral groove 9 to a first end side from an opposite, second end 9' side of the same groove, i.e., toward the heart cam groove 10 that is formed at the first end side of the spiral, groove 9. The pin then reaches one end portion 10a of the heart cam groove 10 through the arcuate path of the same arcuate groove. Subsequently, the pin 8 returns slightly and is caught (i.e., stopped) in the slit 10b of the heart island 10', thereby maintaining the lid in a closed position.

When the lid is pushed again, the operating pin 8 is disengaged from the slit 10b formed in the heart island 10'. The pin 8 then moves to the other end portion 10c of the heart cam groove 10. Subsequently, with the restoring force of the coiled spring 6, the pin 8 linearly returns from the other end portion 10c of the heart cam groove 10 to the first side of the spiral groove 9. Thereafter, the pin 8 moves to the opposite, second end 9' side of the spiral groove 9, at which the lid opens.

In such a conventional rotary damper, however, as the operating pin 8 is provided on the cover 7 side of the cylindrical rotor 1, a vertical size of the entire device becomes large, i.e., the device is not of a compact size. Moreover, as the device uses the cylindrical rotor 1, the housing 2, and and the cover 7, the number of components, and hence the cost, is high.

SUMMARY

To solve the above-mentioned problems, it is an object of the present invention to provide a rotary damper that includes: a damper body mounted on a rotary shaft; a cam mechanism provided in the damper body to set a rotation pattern of the rotary shaft; a restoring force-accumulating member that accumulates a restoring force in accordance with rotation of the rotary shaft; and a rotation control member for controlling the rotation of the rotary shaft. The damper body is formed by setting a bottomed, cylindrical outer case having an opening at one end thereof and a bottomed, cylindrical inner case having an opening at one end thereof, face to face with each other and fitting the two with each other rotatably. The rotation control member is interposed between an inner periphery surface of the outer case and an outer periphery surface of the inner case on an outer periphery side of the damper body, thereby attaining a compact structure and reducing the number of components used and, therefore, consequently reducing cost.

DETAILED DESCRIPTION OF A PREFERRED EMBODIMENT

An embodiment of the present invention will hereafter be described with reference to the accompanying drawings.

Figure 1:
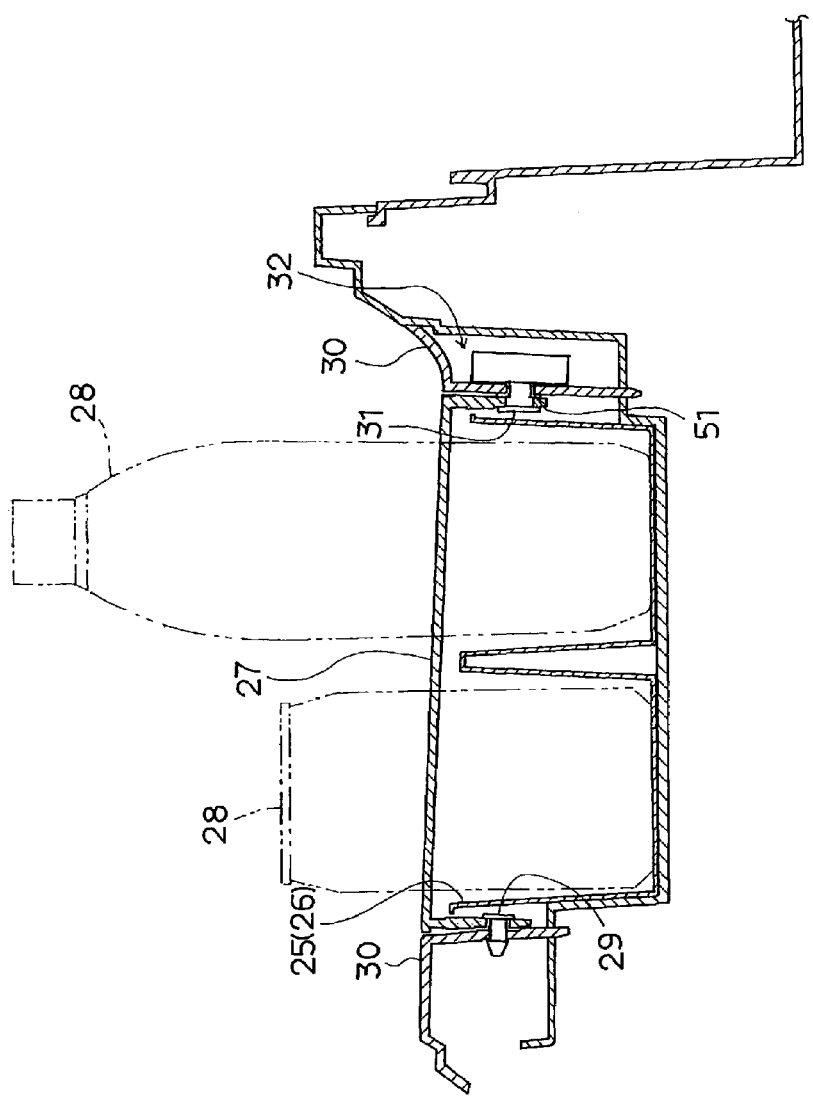
FIG. 1 illustrates the whole of an embodiment of the present invention.
Figure 2:
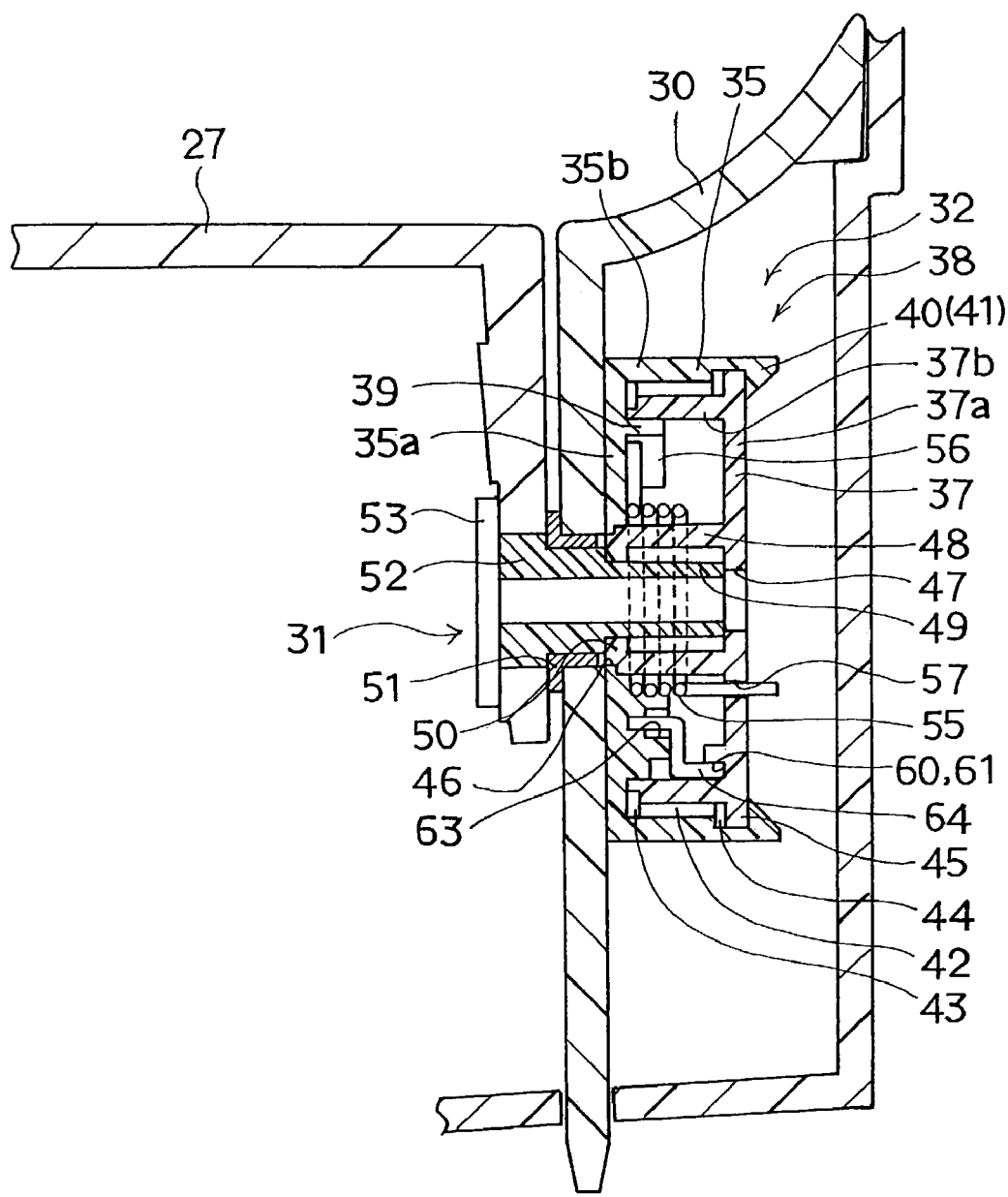
FIG. 2 is a partial enlarged diagram of FIG. 1.
Figure 3:
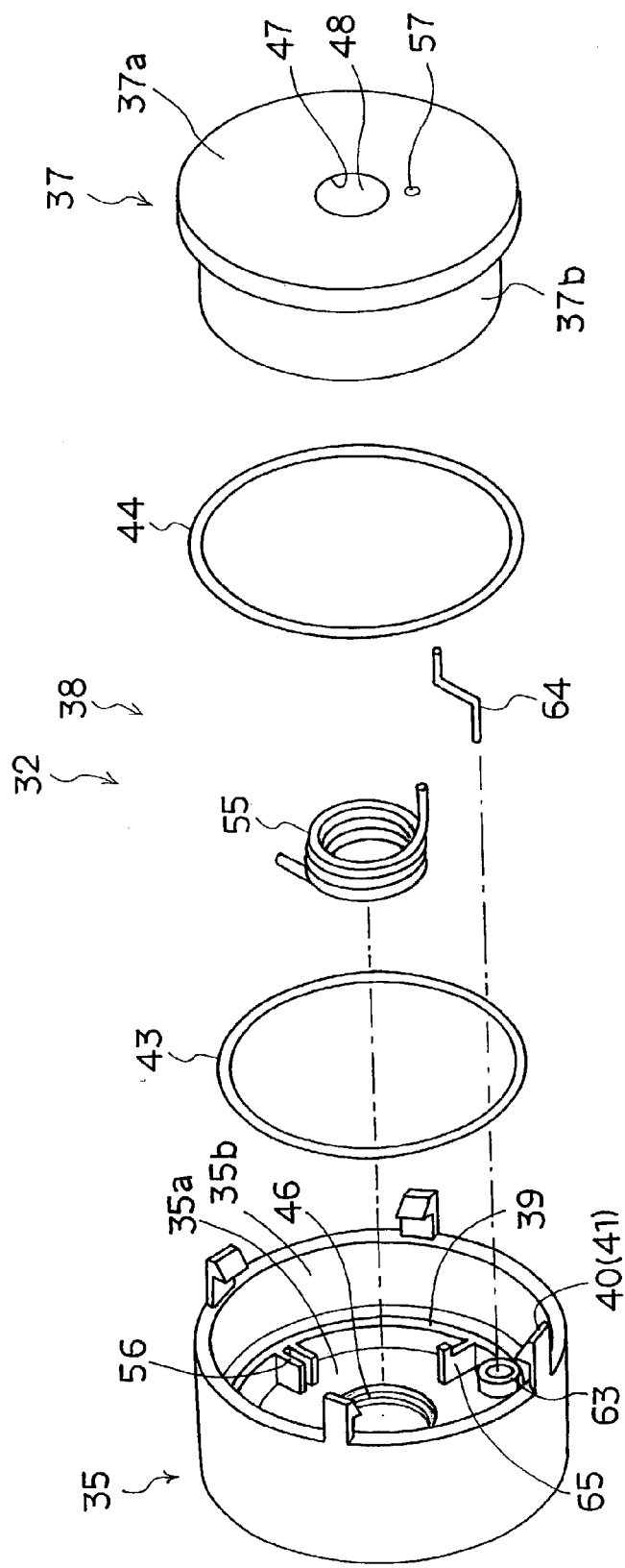
FIG. 3 is an exploded perspective view of a rotary damper shown in FIG. 2.
Figure 4:
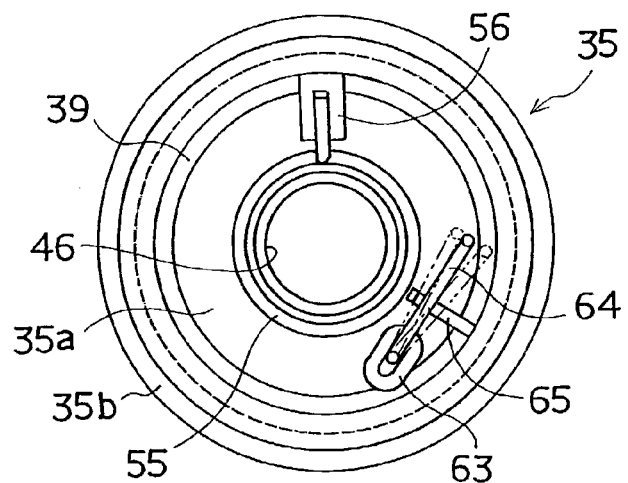
FIG. 4 is an end view of an outer case as seen from an opening side thereof.
Figure 5:
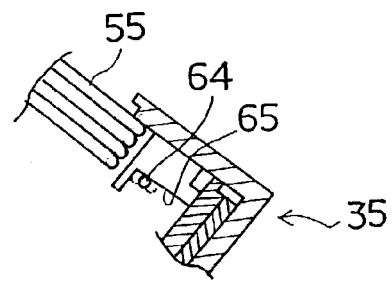
FIG. 5 is a partial enlarged sectional view of the outer case shown in FIG. 4.
Figure 6:
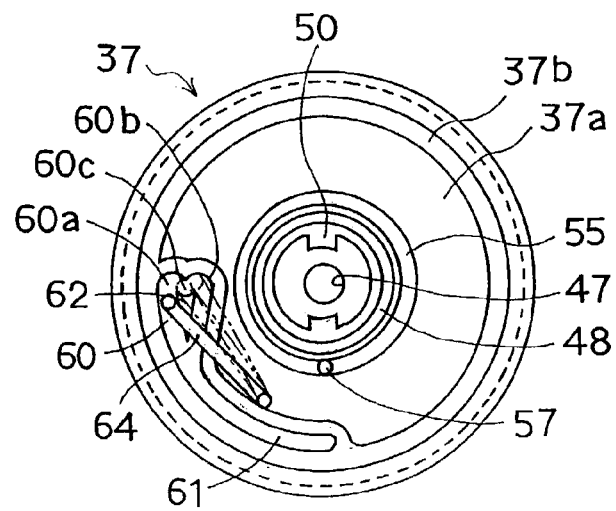
FIG. 6 is an end view of an inner case as seen from an opening side thereof.
Figure 7:
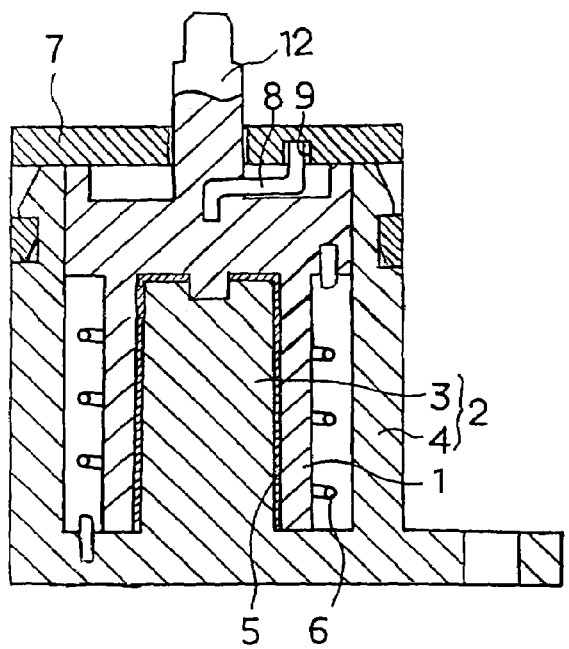
FIG. 7 illustrates a conventional rotary damper.
Figure 8:
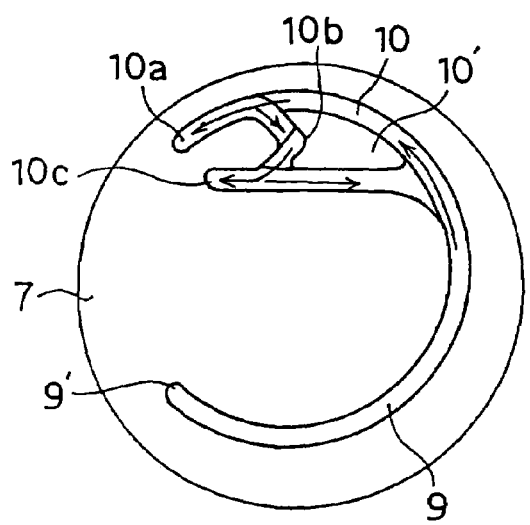
FIG. 8 is an explanatory diagram of a heart cam groove shown in FIG. 7.

First, a description will be given about construction. Within a passenger compartment of a vehicle such as an automobile, a receptacle portion 26 such as a drink holder 25 is provided for example in such a portion as a center console or an instrument panel, as shown in FIG. 1. The drink holder 25 is constructed so as to be covered with an opening/closing lid 27, which closes when pushed once and opens when pushed once more. In FIG. 1, the reference numeral 28 denotes a drink container such as a drink can or a PET bottle.

The lid 27 is connected at one end thereof to a structural member 30, such as a center console or an instrument panel, through a semi-shaft member 29 (e.g., a clip pin) and is supported at an opposite end of the structural member 30 through an input/output shaft 31 (rotary shaft) and a rotary damper 32 in this embodiment.

As shown in FIGS. 2 to 6, the rotary damper 32 of this embodiment is provided with a bottomed, short cylindrical, outer case 35 and a bottomed, short cylindrical, inner case 37. The bottomed, short cylindrical, outer case 35 has an opening at one end thereof. The bottomed, short cylindrical, inner case 37 is sized smaller than the outer case 35 and has an opening at one end thereof.

The outer case 35 and the inner case 37 are brought face-to-face with each other such that the inner case 37 is rotatably fitted in the interior of the outer case 35. As a result, a generally short cylindrical damper body 38 is formed of the inner and outer cases 35, 37. An outer surface of a bottom 35a of the outer case 35 in the damper body 38 is fixed to the structural member 30. On an inner surface of the bottom 35a of the outer case 35 is formed a rib 39 that extends in the circumferential direction to effect positioning of a front-end inner periphery of a peripheral wall 37b of the inner case 37.

Between the outer case 35 and the inner case 37 is provided a retaining portion 40 for making both cases rotatable in the mutually fitted state and for retaining them in the axial direction. For example, the retaining portion 40 comprises plural (four in the figures) retaining pawls 41 arranged in the circumferential direction on a front end of a peripheral wall 35b of the outer case 35 to retain an outer surface of a bottom 37a of the inner case 37.

On an outer periphery side of the damper body 38, a viscous fluid 42, e.g., silicone grease, is interposed between an inner periphery surface of the peripheral wall 35b of the outer case 35 and an outer periphery surface of the peripheral wall 37b of the inner case 37. The viscous fluid 42 is used as a resistor acting as a rotation control member. To seal the viscous fluid 42, a pair of O-rings 43 and 44 are interposed between the inner periphery surface of the outer case 35 and the outer periphery surface of the inner case 37 so as to be spaced a predetermined distance from each other. In this case, one O-ring 43 is fitted and compressed between a base portion of an inner periphery of the peripheral wall 35b of the outer case 35 and a circumferentially extending stepped portion formed at a front-end outer periphery surface of the peripheral wall 37b of the inner case 37. Likewise, the other O-ring 44 is fitted and compressed between a flange 45 formed on a rear-end outer periphery surface of the peripheral wall 37b of the inner case 37 and a circumferentially extending stepped portion formed on a front-end inner periphery surface of the peripheral wall 35a of the outer case 35. The flange 45 is flush with the bottom 37a of the inner case 37.

On the other hand axial holes 46 and 47 for passing the external input/output shaft 31 therethrough are formed axially of the outer case 35 and the inner case 37, respectively. In the interior of the inner case 37, a cylindrical shaft holding portion 48 is projectingly provided to hold the input/output shaft 31,170 which is inserted in an axial position into the damper body 38. Key lugs 50 are formed on a front-end inner periphery side of the shaft holding portion 48 to fit in axially extending key ways 49 that are formed in a front-end outer periphery of the input/output shaft 31. A front-end outer periphery of the shaft holding portion 48 is formed with a stepped portion, which stepped portion is engaged with a stepped portion formed on an inner surface side of the axial hole 46 in the outer case 35 to effect positioning of the two. An intermediate portion of the input/output shaft 31 is supported by the structural member 30 through a bearing member 51 such as a bushing, and a rear end portion thereof is formed with a lid mounting portion 52 for mounting the lid 27 and a flange 53.

A coiled spring 55, which acts as a restoring force accumulating member, is fitted on the outer periphery of the shaft holding portion 48. One end of the coiled spring 55 is anchored to a retaining hole 57 formed in the bottom 37a of the inner case 37. An opposite end of the coiled spring 55 is anchored to a retaining portion 56 formed on the rib 39, which is formed on the inner periphery of the bottom 35a of the outer case 35.

Further, a generally arcuate guide groove 61 having a heart cam groove 60 at one end is formed as part of a cam mechanism in either the inner case 37 or the outer case 35 (the inner case 37 in FIGS. 2 and 6) located in the interior of the damper body 38.

The heart cam groove 60 includes: (a) a heart island 62, (b) end portions 60a and 60b of two arcuate and straight paths, respectively, which are formed along both side portions of the heart island 62, and (c) a slit 60c that is formed in a rear end portion of the heart island 62a an intermediate position of a path that interconnects the two end portions 60a and 60b.

In the interior space of the damper body 38 and sideways of the coiled spring 55 there is disposed an operating pin 64 as part of the cam mechanism. The operating pin 64 is guided at one end thereof by both heart cam groove 60 and guide groove 61 and is retained at an opposite end thereof by a pin retaining portion 63 provided in the other (the outer case 35 in FIGS. 2 and 4) of the inner and outer eases 37, 35. In the other (the outer case 35 in FIGS. 3, 4 and 5) of the inner and outer eases 37, 35 there is provided a guide portion 65 that restricts a movement range of the operating pin 64 and that guides and holds an intermediate part of the operating pin 64, to prevent the pin from coming off the heart cam groove 60, the guide groove 61, and the pin retaining portion 63.

The following description is now provided about the operation of this embodiment.

The rotary damper 32 functions so that the lid 27 of the drink holder 25 closes when pushed once and opens when pushed once more.

More specifically, when the lid 27 is pushed into a closed state from an open state, the input/output shaft 31 connected to the lid 27 is rotated and the inner case 37, which is rendered integral in the rotational direction with the input/output shaft 31 through the key ways 49 and the key lugs 50, rotates relative to the outer case 35.

At this time, the viscous fluid 42 (e.g., silicone oil), which is interposed between the inner periphery surface of the outer case 35 and the outer periphery surface of the inner case 37, functions as fluid bearing. When the rotational force is thus imparted to the inner case through the lid 27, the coiled spring 55 is tightened, thereby accumulating a restoring force.

At this time, the operating pin 64 moves along the guide groove 61 from an opposite end side to one end side of the guide groove. Subsequently, the pin 64 shifts to the heart cam groove 60 located at one end side of the guide groove and reaches one end portion 60a of the heart cam groove 60 through the arcuate path of the same groove. Thereafter, the pin 64 returns a little and is caught (i.e., stopped) in the slit 60c of the heart island 62, thereby maintaining the lid 27 in a closed position.

Next, when the lid 27 is pushed again, the operating pin 64 shifts from the slit 60c of the heart island 62 to the other end portion 60b of the heart cam groove 60. Subsequently, the pin 64, with the restoring force of the coiled spring 55, returns from the other end portion 60b of the heart cam groove 60 to one end side of the guide groove 61 through the straight path. Thereafter the pin 64 moves to the opposite end side of the guide groove 61, thereby opening the lid 27 automatically.

At this time, the viscous fluid 42, which is interposed between the inner periphery surface of the outer case 35 and the outer periphery surface of the inner case 37, functions as a rotation control member, so that the lid 27 opens slowly with a high-class feeling.

According to this embodiment, as the bottomed, short cylindrical outer and inner cases 35, 37 (each of which has an opening at one end thereof) are brought face-to-face with each other and as the inner and outer cases 35, 37 are fitted together to form the damper body 38, it is possible to reduce the number of components used, thereby reducing the cost.

Further, as the operating pin 64 is disposed sideways of the coiled spring 55 in the internal space of the damper body 38, it is possible to form the damper body 38 in a generally short cylindrical shape, thereby attaining a compact structure of the device.

Although an embodiment of the present invention has been described above in detail with reference to the accompanying drawings, no limitation is made thereto, but there may be made design changes and the like insofar as they are within the scope not departing from the gist of the present invention.

For example, it is not limited to the lid 27 of the drink holder that the rotary damper 32 of this embodiment is applied.

What is claimed is:

1. A rotary damper comprising:
    a rotary shaft;
    a damper body mounted on the rotary shaft, the damper body comprising:
        a bottomed, cylindrical outer case, which has an opening at one end thereof on an opposite side to which the rotary shaft extends and having a retaining portion on the opening at the one end; and
        a bottomed, cylindrical inner case, which has an opening at one end thereof, wherein the inner case is rotatably arranged in the outer case and a bottom surface thereof is retained by the retaining portion of the outer case;
    a cam mechanism provided in the damper body to set a rotation pattern of the rotary shaft;
    a restoring force-accumulating member that accumulates a restoring force in accordance with rotation of the rotary shaft; and
    a rotation control member for controlling the rotation of the rotary shaft,
    wherein said rotation control member is interposed between an inner periphery surface of said outer case and an outer periphery surface of said inner case,
    wherein said restoring force-accumulating member is provided around the rotary shaft in the damper body,
    wherein said cam mechanism extends from said outer case to said inner case, and
    wherein said cam mechanism is disposed radially and side-by-side relative to the rotary shaft and the restoring force-accumulating member in the damper body.

2. The rotary damper according to claim 1,
    wherein said cam mechanism comprises a guide groove and an operating pin,
    wherein said guide groove is formed in one of said inner case and said outer case, and
    wherein said operating pin is guided at one end thereof by said guide groove and retained at an opposite end thereof by the other of said inner case and said outer case.

3. The rotary damper according to claim 2,
    wherein a shaft holding portion is formed in an interior of said inner case for coupling a rotational axis of said damper body and said rotary shaft,
    wherein said restoring force-accumulating member is a coiled spring that is fitted on an outer periphery side of said shaft holding portion,
    wherein both ends of said coiled spring are anchored to said inner case and said outer case, respectively,
    wherein said guide groove of said cam mechanism has a heart cam groove in an end portion thereof, and
    wherein said cam mechanism is disposed side-by-side with respect to said coiled spring in an interior space of said damper body.

4. The rotary damper according to claim 1, wherein said rotation control member is a viscous fluid.

5. The rotary damper according to claim 2, wherein said rotation control member is a viscous fluid.

6. The rotary damper according to claim 3, wherein said rotation control member is a viscous fluid.

7. The rotary damper according to claim 4, wherein said viscous fluid comprises silicon grease.

8. The rotary damper according to claim 5, wherein said viscous fluid comprises silicon grease.

9. The rotary damper according to claim 6, wherein said viscous fluid comprises silicon grease.

10. A rotary damper comprising:
    a rotary shaft;
    a damper body mounted on the rotary shaft, the damper body comprising:
        a bottomed, cylindrical outer case, which has an opening at one end thereof on an opposite side to which the rotary shaft extends and having a retaining portion on the opening at the one end; and
        a bottomed, cylindrical inner case, which has an opening at one end thereof, wherein the inner case is rotatably arranged in the outer case and a bottom surface thereof is retained by the retaining portion of the outer case;
    a cam mechanism provided in the damper body to set a rotation pattern of the rotary shaft;
    a restoring force-accumulating member that accumulates a restoring force in accordance with rotation of the rotary shaft; and
    a rotation control member for controlling the rotation of the rotary shaft,
    wherein said rotation control member is interposed between an inner periphery surface of said outer case and an outer periphery surface of said inner case,
    wherein said restoring force-accumulating member is provided around the rotary shaft in the damper body,
    wherein said cam mechanism comprises a guide groove and an operating pin,
    wherein said cam mechanism is disposed radially and side-by-side relative to the rotary shaft and the restoring force-accumulating member in the damper body,
    wherein said guide groove is formed in one of said inner case and said outer case, and
    wherein said operating pin is guided at one end thereof by said guide groove and retained at an opposite end thereof by the other of said inner case and said outer case.

11. The rotary damper according to claim 10,
wherein a shaft holding portion is formed in an interior of said inner case for coupling a rotational axis of said damper body and said rotary shaft,
wherein said restoring force-accumulating member is a coiled spring that is fitted on an outer periphery side of said shaft holding portion,
wherein both ends of said coiled spring are anchored to said inner case and said outer case, respectively,
wherein said guide groove of said cam mechanism has a heart cam groove in an end portion thereof, and
wherein said cam mechanism is disposed side-by-side with respect to said coiled spring in an interior space of said damper body.

12. The rotary damper according to claim 10, wherein said rotation control member is a viscous fluid.

13. The rotary damper according to claim 11, wherein said rotation control member is a viscous fluid.

14. The rotary damper according to claim 12, wherein said viscous fluid comprises silicon grease.

15. The rotary damper according to claim 13, wherein said viscous fluid comprises silicon grease.

16. A rotary damper, comprising:
a rotary shaft;
a damper body mounted on the rotary shaft, the damper body comprising:
an outer case having an opening on one end on an opposite side to which the rotary shaft extends, a bottom surface on the other end thereof and a retaining portion on the opening on the one end; and
an inner case rotatably arranged in the outer case and having an opening on one end, and a bottom surface on the other thereof being retained by the retaining portion of the outer case;
a cam mechanism provided in the damper body configured to set a rotation pattern of the rotary shaft;
a restoring force-accumulating member configured to accumulate a restoring force in accordance with rotation of the rotary shaft; and
a rotation control member interposed between an inner periphery surface of the outer case and an outer periphery surface of the inner case on an outer periphery side of the damper body and configured to control the rotation of the rotary shaft.

17. The rotary damper according to claim 16, wherein the retaining portion includes a plurality of retaining pawls provided on the opening on the one end of the outer case in a circumferential direction of the outer case.

18. The rotary damper according to claim 16, wherein the cam mechanism includes a guide groove provided in one of the inner case and the outer case, and an operating pin guided on one end thereof by the guide groove and retained on an opposite end thereof by the other of the inner case and the outer case.

19. The rotary damper according to claim 16, wherein the cam mechanism is disposed to extend from the outer case to the inner case and disposed sideways of the restoring force-accumulating member in the damper body.

* * * * *